United States Patent
Hwang et al.

(10) Patent No.: US 7,860,451 B2
(45) Date of Patent: Dec. 28, 2010

(54) APPARATUS FOR CONTROLLING POWER OF RELAY IN AMPLIFY-FORWARD RELAY SYSTEM AND METHOD USING THE SAME

(75) Inventors: Duck Dong Hwang, Yongin-si (KR); Eung Sun Kim, Yongin-si (KR); Young-Doo Kim, Yongin-si (KR); Chang Wook Ahn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 960 days.

(21) Appl. No.: 11/716,695

(22) Filed: Mar. 12, 2007

(65) Prior Publication Data

US 2008/0076349 A1 Mar. 27, 2008

(30) Foreign Application Priority Data

Sep. 27, 2006 (KR) ...................... 10-2006-0094325

(51) Int. Cl.
*H04B 3/36* (2006.01)
*H04B 7/14* (2006.01)

(52) U.S. Cl. .................. 455/7; 455/15; 455/16; 455/24; 455/13.4; 455/522

(58) Field of Classification Search .............. 455/7, 455/15, 16, 24, 13.4, 522
See application file for complete search history.

(56) References Cited

U.S. PATENT DOCUMENTS

| | | | |
|---|---|---|---|
| 6,690,657 B1 * | 2/2004 | Lau et al. ................... 370/315 |
| 6,745,003 B1 | 6/2004 | Maca et al. | |
| 6,889,033 B2 | 5/2005 | Bongfeldt | |
| 7,043,203 B2 | 5/2006 | Miquel et al. | |
| 7,463,673 B2 * | 12/2008 | Fujii et al. .................. 375/211 |
| 7,643,793 B2 * | 1/2010 | Park et al. ..................... 455/16 |
| 2004/0135684 A1 | 7/2004 | Steinthal et al. | |
| 2004/0165684 A1 | 8/2004 | Ketchum et al. | |
| 2004/0229563 A1 * | 11/2004 | Fitton et al. .................... 455/7 |
| 2004/0266339 A1 | 12/2004 | Larsson | |
| 2005/0255808 A1 | 11/2005 | Ahmed et al. | |
| 2006/0199530 A1 * | 9/2006 | Kawasaki ...................... 455/7 |
| 2007/0066337 A1 * | 3/2007 | Hart ............................. 455/522 |
| 2009/0047898 A1 * | 2/2009 | Imamura et al. ................ 455/7 |
| 2009/0227201 A1 * | 9/2009 | Imai et al. ...................... 455/7 |

FOREIGN PATENT DOCUMENTS

KR 10-2006-0050894 A 5/2006

* cited by examiner

*Primary Examiner*—Matthew D. Anderson
*Assistant Examiner*—Wen W Huang
(74) *Attorney, Agent, or Firm*—Sughrue Mion, PLLC

(57) ABSTRACT

A method and apparatus for controlling a power of a relay are provided. The apparatus includes: a signal receiver which receives signals which are transmitted to a plurality of receiving antennas directly from a source or via at least one relay; a channel information acquirement unit which acquires channel information between the source and the at least one relay, and acquires channel information between the at least one relay and the plurality of receiving antennas; a power control signal generation unit which generates a power control signal, based on the acquired channel information and a maximum SNR; and a relay power control unit which transmits the generated power control signal to the relay and thereby controls a transmit signal power with respect to the at least one relay.

13 Claims, 5 Drawing Sheets

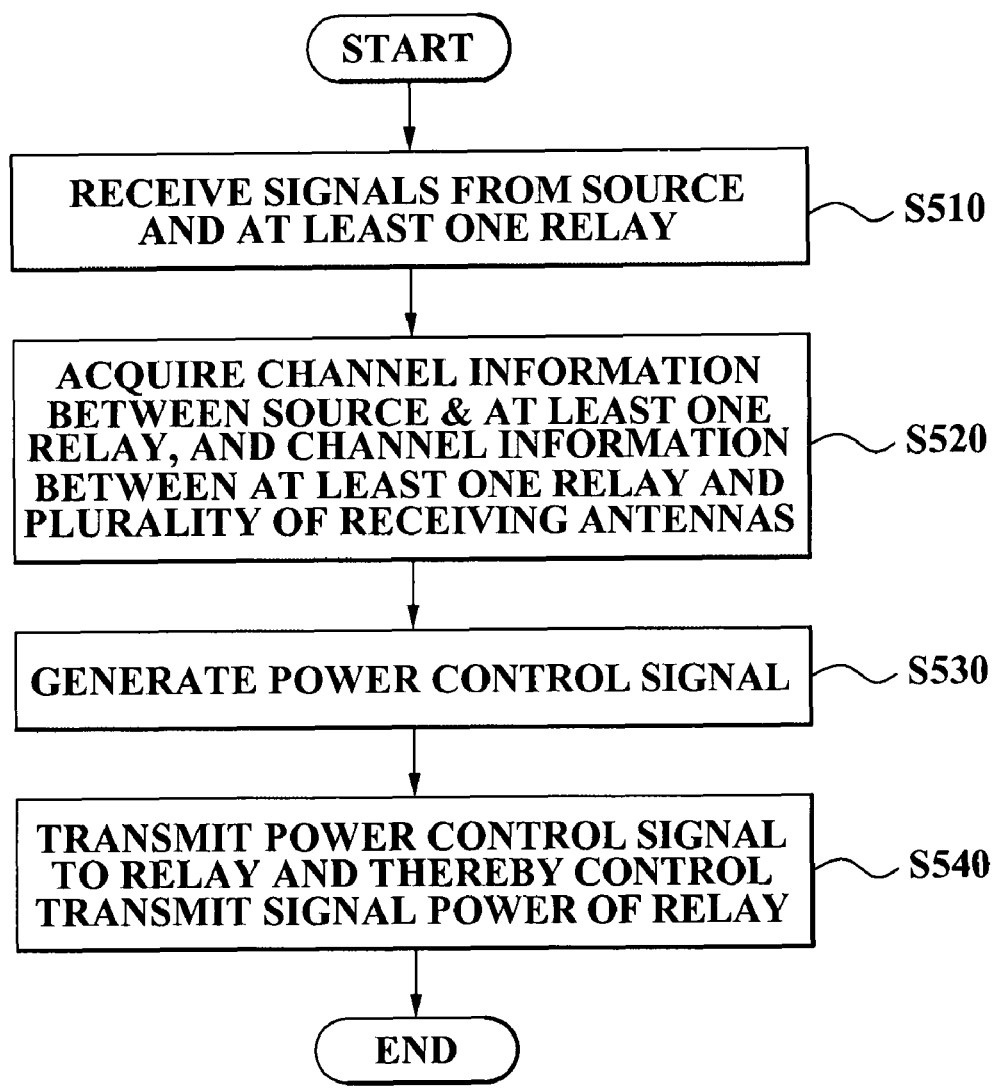

APPARATUS FOR CONTROLLING POWER OF RELAY IN AMPLIFY-FORWARD RELAY SYSTEM AND METHOD USING THE SAME

CROSS-REFERENCE TO RELATED APPLICATION

This application claims priority from Korean Patent Application No. 10-2006-0094325, filed on Sep. 27, 2006, in the Korean Intellectual Property Office, the entire disclosure of which is incorporated herein by reference.

BACKGROUND OF THE INVENTION

1. Field of the Invention

Methods and apparatuses consistent with the present invention relate to a relay power control, and more particularly, to an apparatus for controlling a power of a relay in an amplify-forward (AF) relay system and a method of operating the apparatus.

2. Description of Related Art

Various types of methods are utilized to transmit data between a source and a destination in a wireless communication system, and generally include a method of directly transmitting data from a source to a destination, and a method of transmitting data from a source to a relay and then transmitting the data from the relay to a destination.

Also, examples of a method of effectively transmitting data using a relay include an amplify-forward (AF) method, and a decode-forward (DF) method.

In the AF method, a source simultaneously transmits data to both a relay and a destination. Next, the relay amplifies a received signal and transmits the amplified signal to the destination. Specifically, the relay is required to merely amplify the received signal and retransmit the amplified signal.

Thus, a receiving performance of the destination is determined depending upon a transmit signal power which is amplified by the relay. Also, to improve the receiving performance of the destination, the destination is required to control the transmit signal power of the relay.

Accordingly, an apparatus which can improve a receiving performance by controlling a transmit signal power of a relay in a destination is desired.

SUMMARY OF THE INVENTION

The present invention provides a relay power control apparatus and method in which a destination may control a transmit signal power of at least one relay by using a maximum generalized eigenvalue with respect to the at least one relay.

The present invention also provides a relay power control apparatus and method which may control a transmit signal power of at least one relay so that a signal-to-noise ratio (SNR) of a received signal is increased.

The present invention also provides a relay power control apparatus and method which may improve reception by providing a plurality of receive modes wherein a receive mode is selected based on a comparison of a SNR with respect to each of the plurality of receive modes.

According to an aspect of the present invention, there is provided an apparatus for controlling a power of a relay, the apparatus including: a signal receiver which receives signals which are transmitted to a plurality of receiving antennas directly from a source or via at least one relay; a channel information acquirement unit which acquires channel information between the source and the at least one relay, and acquires channel information between the at least one relay and the plurality of receiving antennas; a power control signal generation unit which generates a power control signal, based on the acquired channel information and a maximum signal-to-noise ratio (SNR); and a relay power control unit which transmits the generated power control signal to the relay and thereby controls a transmit signal power with respect to the at least one relay.

In this instance, the maximum SNR may correspond to a SNR which is calculated before the signals received from the at least one relay are combined.

Also, the apparatus may further include a receive mode determination unit which determines a receive mode based on the channel information and the power control signal with respect to the at least one relay.

In this instance, the receive mode determination unit may determine, as a receive mode, any one of a receive mode of directly receiving only signals which are transmitted from the source via the plurality of receiving antennas, a receive mode of receiving signals which are transmitted from the source and the at least one relay via the plurality of receiving antennas, and a plurality of receive modes of receiving signals which are transmitted from the source and the at least one relay via only a single antenna among the plurality of receiving antennas, and corresponding to the plurality of receiving antennas respectively.

According to another aspect of the present invention, there is provided a method of controlling a power of a relay, the method including: receiving signals which are transmitted to a plurality of receiving antennas directly from a source or via at least one relay; acquiring channel information between the source and the at least one relay, and acquiring channel information between the at least one relay and the plurality of receiving antennas; generating a power control signal, based on the acquired channel information and a maximum SNR; and transmitting the generated power control signal to the relay and thereby controlling a transmit signal power with respect to the at least one relay.

In this instance, the power control signal may be generated based on an eigenvector corresponding to a maximum generalized eigenvalue with respect to each of the at least one relay, based on the acquired channel information and the maximum SNR.

Also, the method of controlling a power of a relay may further include determining a receive mode based on the channel information and the power control signal with respect to the at least one relay.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 5 is a flowchart illustrating a method of controlling a power of a relay according to an exemplary embodiment of the present invention.

DETAILED DESCRIPTION OF EXEMPLARY EMBODIMENTS OF THE INVENTION

Figure 1:
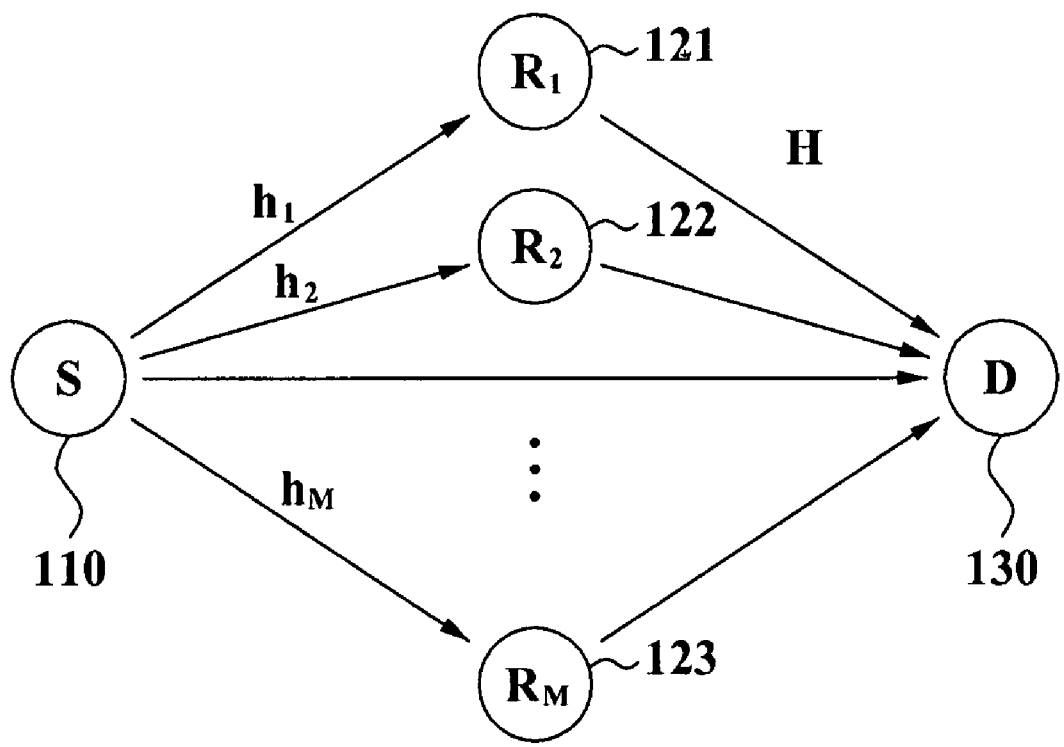
FIG. 1 is a diagram illustrating a relay system of a relay power control apparatus according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating a relay system of a relay power control apparatus according to an exemplary embodiment of the present invention.

Referring to FIG. 1, the relay system includes a source (S) 110, a plurality of relays (R) 121, 122, and 123, and a destination (D) 130.

The source 110 corresponding to a base station transmits a signal to the plurality of relays 121, 122, and 123, and the destination 130.

Each of the relays 121, 122, and 123 receives the signal from the source 110, amplifies the received signal, and transmits the amplified signal to the destination 130.

In this instance, the signal received by each of the relays 121, 122, and 123 includes noise information and channel information $h_1, h_2, \ldots, h_M$ between the source 110 and the plurality of relays 121, 122, and 123. Specifically, each of the relays 121, 122, and 123 amplifies a noise signal and the signal which includes corresponding channel information, and transmits the amplified signal and noise signal to the destination 130.

In this instance, each of the relays 121, 122, and 123 receives the signal in a first symbol time, and transmits the received signal to the destination 130 in a second symbol time.

The destination 130 corresponds to a wireless terminal and includes a plurality of receiving antennas. Also, the destination 130 controls a transmit signal power of each of the relays 121, 122, and 123 by using channel information from the source 110 to each of the relays 121, 122, and 123 and also using channel information from each of the relays 121, 122, and 123 to the destination 130.

In this instance, the transmit signal power with respect to each of the relays 121, 122, and 123 is controlled by using a signal-to-noise ratio (SNR) and channel information of signals which are received by the wireless terminal.

Also, the channel information includes the channel information $h_1, h_2, \ldots, h_M$ between the source 110 and the plurality of relays 121, 122, and 123, and channel information H between the plurality of relays 121, 122, and 123 and the plurality of receiving antennas of the destination 130.

Also, the SNR may correspond to a maximum SNR which is calculated before signals, which are received from the plurality of relays 121, 122, and 123, are combined via a combiner of the wireless terminal.

Figure 2:
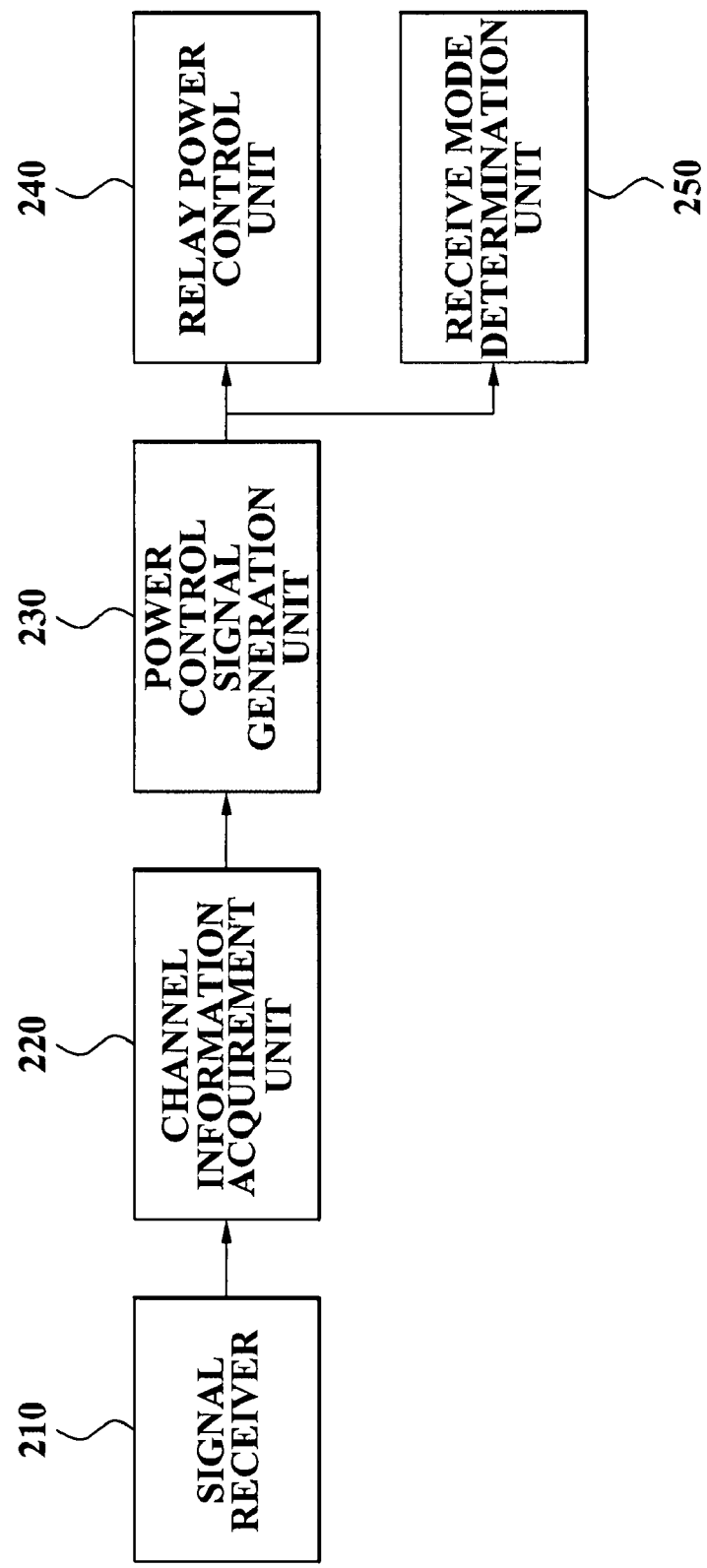
FIG. 2 is a block diagram illustrating a relay power control apparatus according to an exemplary embodiment of the present invention.

FIG. 2 is a block diagram illustrating a relay power control apparatus according to an exemplary embodiment of the present invention. In this instance, the relay power control apparatus is constructed in the destination 130 illustrated in FIG. 1.

Referring to FIG. 2, the relay power control apparatus includes a signal receiver 210, a channel information acquirement unit 220, a power control signal generation unit 230, a relay power control unit 240, and a receive mode determination unit 250.

The signal receiver 210 receives signals which are transmitted to a plurality of receiving antennas directly from a source or via at least one relay.

The channel information acquirement unit 220 acquires channel information between the source and the at least one relay, and acquires channel information between the at least one relay and the plurality of receiving antennas.

The power control signal generation unit 230 generates a power control signal, based on the acquired channel information by the channel information acquirement unit 220 and a maximum SNR.

In this instance, an SNR of a combined signal via a combiner (not illustrated) of the destination may be represented as $$SNR = \frac{E_S}{N_R} \frac{r^+(HDhh^+D^+H)r}{r^+(HDD^+H^+ + \beta I_N)r}, \quad \beta = \frac{N_D}{N_R} \quad \text{[Equation 1]}$$

In this instance, $E_S$ designates a signal energy transmitted from the source, $N_R$ designates a noise power spectrum density of the relay, $N_D$ designates a noise power spectrum density of the receiving antenna, h designates a vector with respect to channel information between an M number of relays and the source, H designates a channel information matrix between the M number of relays and an N number of receiving antennas, N designates a number of receiving antennas, + designates a Hermitian matrix, r designates a combine vector of a signal which is received by the N number of receiving antennas, I designates an identity matrix, and D designates a diagonal matrix of a power control signal with respect to the M number of relays.

As shown in Equation 1, r may be a generalized eigenvector with a maximum generalized eigenvalue in order to acquire the maximum SNR. However, since a phase with respect to r is ambiguous and Equation 1 is a function with respect to r and D, the power control signal with the maximum SNR with respect to each of the at least one relay may not be generated by using the combined signal from the combiner.

Thus, according to this exemplary embodiment, it is possible to generate the power control signal with the maximum SNR before signals received by the N number of receiving antennas are combined.

Specifically, the power control signal generation unit 230 generates a power control signal of an eigenvector corresponding to a maximum generalized eigenvalue with respect to each of the at least one relay where the SNR becomes maximum with respect to signals which are not yet combined by the combiner.

Also, the power control signal of the eigenvector corresponding to the maximum generalized eigenvalue with respect to each of the at least one relay, which has the maximum SNR with respect to the signals which are not yet combined by the combiner, may be generated by $$SNR = \frac{E_S}{N_R} \frac{d^+ \left(\sum_{i=1}^{N} \overline{H}_i hh^+ \overline{H}_i^+\right) d}{d^+ \left(\sum_{i=1}^{N} \overline{H}_i \overline{H}_i^+ + \beta I_N\right) d}, \quad \beta = \frac{N_D}{N_R} \quad \text{[Equation 2]}$$

$$h = [h_1 \; h_2 \; \cdots \; h_M]^t,$$
$$\overline{H}_i = diag[h_{i,1} \; h_{i,2} \; \cdots \; h_{i,M}], |d| = \lambda E_S$$

In this instance, SNR designates the maximum SNR with respect to the signals which are not combined by the combiner, $\overline{H}_i$ designates a diagonal matrix with respect to channel information between an $i^{th}$ receiving antenna and the at least one relay, t designates a transpose matrix, d designates a power control signal matrix of the eigenvector corresponding to the maximum generalized eigenvalue with respect to each of the at least one relay, and λ designates a predetermined power distribution value between the source and the at least one relay.

As shown in Equation 2, d corresponding to the power control signal matrix with respect to each of the at least one relay may be an eigenvector corresponding to the maximum generalized eigenvalue in order to maximize the SNR. In this instance, the SNR is calculated before the signals received by the plurality of receiving antennas are combined by the combiner.

Specifically, the power control signal associated with the maximum SNR may be generated by using channel information between the source and the at least one relay, the channel information between the at least one relay and the plurality of receiving antennas, and the maximum SNR with respect to the not-yet-combined signals.

Thus, the power control signal generation unit 230 generates the power control signal with respect to a transmit signal of the at least one relay, so that the SNR may be maximized in accord with Equation 2.

The relay power control unit 240 transmits the generated power control signal to the relay and thereby controls a transmit signal power with respect to the at least one relay.

As described above, the relay power control apparatus according to an exemplary embodiment controls a transmit signal power with respect to at least one relay by using a maximum generalized eigenvalue.

Figure 3:
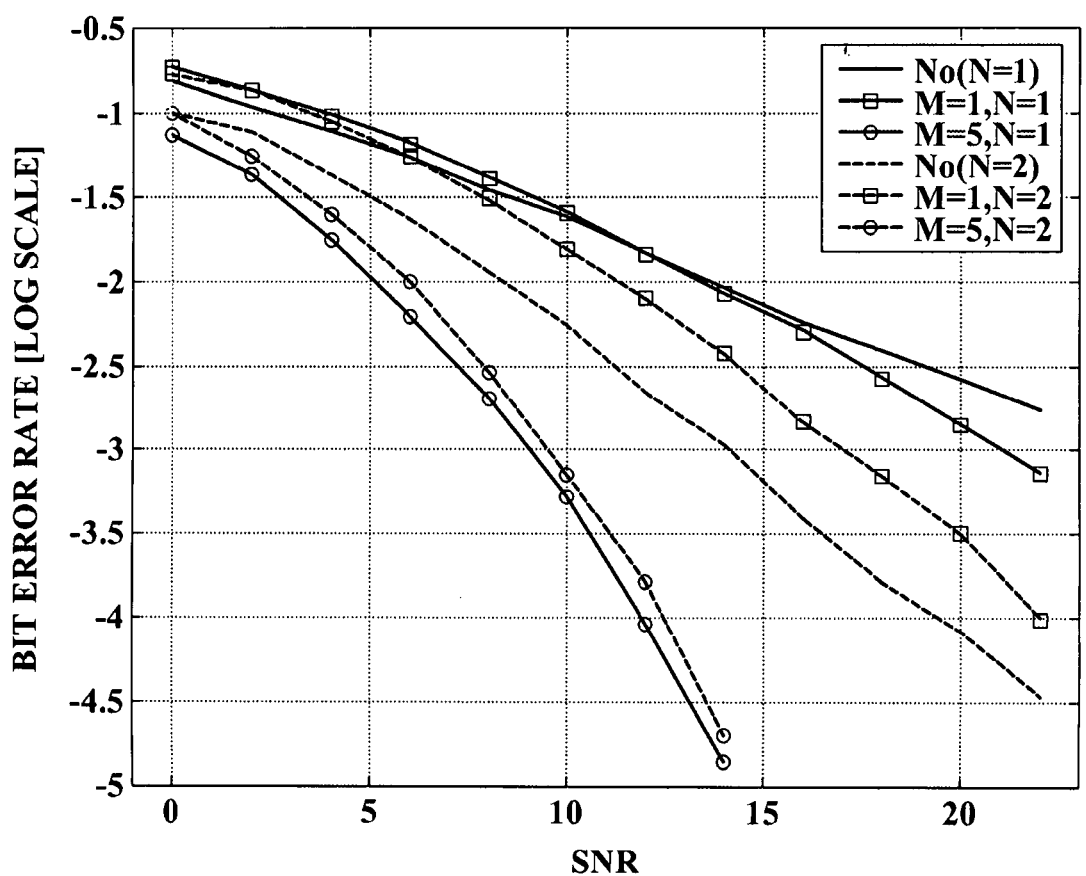
FIG. 3 is a graph illustrating an example of a receiving performance according to a number of relays and receiving antennas according to an exemplary embodiment of the present invention.

FIG. 3 is a graph illustrating an example of a receiving performance according to a number of relays and receiving antennas according to an exemplary embodiment of the present invention.

As illustrated in FIG. 3, as the number of relays increases, an improved receive diversity is acquired. Specifically, in comparison to a single relay, five relays may acquire a higher receive diversity gain.

Conversely, when the number of receiving antennas is two, a receive diversity may be improved more when no relay is provided than when a single relay is provided. In this instance, a channel vector between the at least one relay and the destination may be not sufficiently steered with only the power control signal with respect to the at least one relay.

Accordingly, to improve the receiving performance, the receive mode determination unit 250 illustrated in FIG. 2 determines a receive mode of a signal which is received.

In this instance, the receive mode determination unit 250 determines the receive mode based on the channel information which is acquired by the channel information acquirement unit 220 and the power control signal which is generated by the power control signal generation unit 230.

Also, when the number of receiving antennas is N, the receive mode determination unit 250 may determine a receive mode from an N+2 number of receive modes.

Specifically, the receive mode determination unit 250 determines, as a receive mode, any one of the N+2 number of receive modes including a receive mode of directly receiving only signals which are transmitted from the source via the N number of receiving antennas, a receive mode of receiving signals which are transmitted from the source and the at least one relay, via the N number of receiving antennas, and an N number of receive modes of receiving signals which are transmitted from the source and the at least one relay, via only a single antenna among the N number of receiving antennas, and corresponding to the N number of receiving antennas respectively.

The receive mode determination unit 250 may calculate an SNR with respect to each of the N+2 receive modes, and determine, as the receive mode, a receive mode having the largest SNR among a plurality of calculated SNRs.

Specifically, the receive mode determination unit 250 may determine the receive mode by $$\frac{E_S}{N_D}(1+\lambda)|h_0|^2, \quad \text{[Equation 3]}$$

$$\max \frac{E_S}{N_D} \frac{r^+\left(\lambda HDhh^+D^+H^+ + |h_0|^2\left(\frac{HDD^+H^+}{\beta}+I_N\right)\right)r}{r^+\left(\frac{HDD^+H^+}{\beta}+I_N\right)r},$$

$$\max \frac{E_S}{N_D} \frac{d_j^+\left(\lambda \overline{H}_j hh^+ \overline{H}_j^+ + |h_0|^2\left(\frac{\overline{H}_j \overline{H}_j^+}{\beta}+I_M\right)\right)d_j}{d_j^+\left(\frac{\overline{H}_j \overline{H}_j^+}{\beta}+I_M\right)d_j},$$

$$|d_j| = 1, j = 1, 2, \ldots, N$$

In this instance, $h_0$ designates channel information between the source and the plurality of receiving antennas, and $\overline{H}_j$ designates a diagonal matrix with respect to channel information between a $j^{th}$ receiving antenna and the at least one relay.

As shown in Equation 3, the receive mode determination unit 250 determines, as the receive mode, a receive mode having the largest SNR among: a receive mode of directly receiving a signal from the source without a relay, a receive mode of using all the N number of receiving antennas, and the N number of receive modes corresponding to the N number of receiving antennas, respectively.

Figure 4:
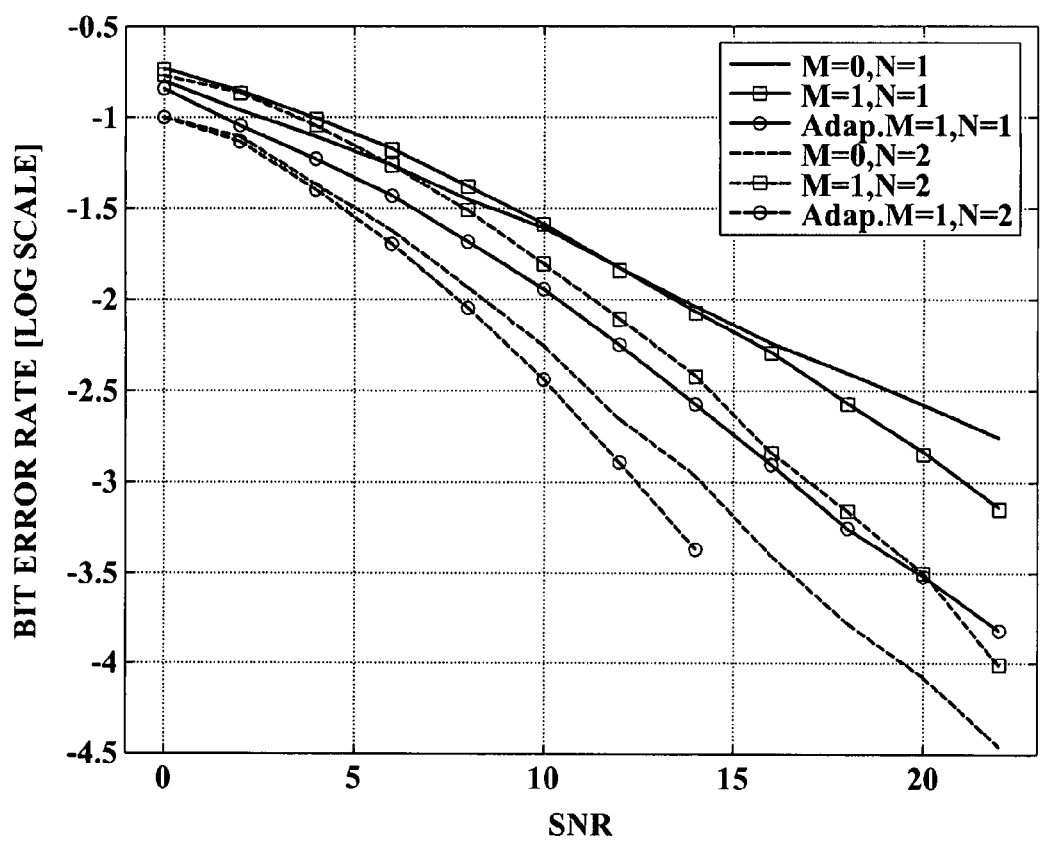
FIG. 4 is a graph illustrating an example of a receiving performance depending upon adoption of a receive mode with respect to a number of relays and receiving antennas according to an exemplary embodiment of the present invention.

FIG. 4 is a graph illustrating an example of a receiving performance depending upon adoption of a receive mode with respect to a number of relays and receiving antennas according to an exemplary embodiment of the present invention.

As illustrated in FIG. 4, there is greater improvement in reception diversity when a receive mode, determined by a receive mode determination unit, is adopted than when the receive mode is not adopted.

As described above, the reception diversity may be improved by determining a transmit signal power of a relay in a destination, transmitting a power control signal for controlling the determined transmit signal power to the relay, and determining a receive mode with respect to a signal which is transmitted directly from the source or via the relay.

FIG. 5 is a flowchart illustrating a method of controlling a power of a relay according to an exemplary embodiment of the present invention.

Referring to FIG. 5, in operation S510, a relay power control apparatus according to this exemplary embodiment receives signals which are transmitted to a plurality of receiving antennas directly from a source or via at least one relay.

In operation S520, channel information between the source and the at least one relay, and channel information between the at least one relay and the plurality of receiving antennas are acquired from the received signals.

In operation S530, a power control signal is generated based on the acquired channel information and a maximum SNR.

In this instance, the power control signal may be generated based on the maximum SNR which is calculated before the signals received from the at least one relay are combined.

Also, the power control signal may be a power control signal of an eigenvector corresponding to a maximum generalized eigenvalue with respect to each of the at least one relay.

In this instance, the power control signal may be generated by using Equation 2 above.

In operation S540, the relay power control apparatus transmits the generated power control signal to the relay and thereby controls a transmit signal power with respect to the at least one relay. Specifically, the transmit signal power of the relay may be controlled by using the power control signal which is generated by the destination.

Also, the receive mode may be determined based on the generated power control signal to improve the reception diversity of a signal which is received by the destination.

In this instance, when the number of receiving antennas is N, an N+2 number of receive modes may be provided. Specifically, the receive mode may be determined from: a receive mode of directly receiving only signals which are transmitted from the source via the plurality of receiving antennas, a receive mode of receiving signals which are transmitted from the source and the at least one relay, via the plurality of receiving antennas, and a plurality of receive modes of receiving signals which are transmitted from the source and the at least one relay, via only a single antenna among the plurality of receiving antennas, and corresponding to the plurality of receiving antennas, respectively.

In this instance, an SNR is calculated with respect to each of the N+2 number of receive modes. A receive mode with the greatest SNR among the calculated SNRs may be determined as the receive mode.

Specifically, the receive mode may be determined by using Equation 3 above.

As described above, the relay power control method according to this exemplary embodiment may improve the reception diversity by generating a power control signal for controlling a transmit signal power of a relay in a destination, transmitting the generated power control signal to the relay, and determining a receive mode with respect to signals which are received via a plurality of receiving antennas.

The relay power control method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the exemplary embodiments, a destination may control a transmit signal power of at least one relay by using a maximum generalized eigenvalue with respect to the at least one relay. Thus, the reception diversity may be improved.

Also, according the exemplary embodiments, it is possible to improve the reception diversity by controlling a transmit signal power of at least one relay so that a signal-to-noise ratio (SNR) of a received signal may be maximized.

Also, according to the exemplary embodiments, it is possible to improve a receiving performance by providing a plurality of receive modes and determining a receive mode according to a result of a comparison of an SNR with respect to each of the plurality of receive modes.

Although a few exemplary embodiments of the present invention have been shown and described, the present invention is not limited to the described exemplary embodiments. Rather, it would be appreciated by those skilled in the art that changes may be made to these exemplary embodiments without departing from the principles and spirit of the invention, the scope of which is defined by the claims and their equivalents.

What is claimed is:

1. An apparatus for controlling a power of a controlled relay, the apparatus comprising:
    a signal receiver which receives signals which are transmitted to a plurality of receiving antennas directly from a source or via at least one relay;
    a channel information acquisition unit which acquires channel information between the source and the at least one relay, and between the at least one relay and the plurality of receiving antennas;
    a power control signal generation unit which generates a power control signal, based on the acquired channel information and a signal-to-noise ratio (SNR) of at least one of the signals received; and
    a relay power control unit which transmits the generated power control signal to the controlled relay to control a transmit signal power of the controlled relay,
    wherein the SNR corresponds to a maximum SNR of the signals received which is calculated before the signals received are combined, and
    wherein the power control signal generation unit generates a power control signal based on an eigenvector corresponding to a maximum generalized eigenvalue with respect to each of the at least one relay, based on the acquired channel information and the maximum SNR.

2. The apparatus of claim 1, wherein the power control signal generation unit generates the power control signal of the eigenvector corresponding to the maximum generalized eigenvalue with respect to each of the at least one relay based on the following equation, $$SNR = \frac{E_S}{N_R} \frac{d^+\left(\sum_{i=1}^{N} \overline{H}_i h h^+ \overline{H}_i^+\right) d}{d^+\left(\sum_{i=1}^{N} \overline{H}_i \overline{H}_i^+ + \beta I_N\right) d}, \quad \beta = \frac{N_D}{N_R}$$

$$h = [h_1 \ h_2 \ \cdots \ h_M]^t,$$

$$\overline{H}_i = diag[h_{i,1} \ h_{i,2} \ \cdots \ h_{i,M}], \ |d| = \lambda E_S$$

where $E_s$ designates a signal energy transmitted from the source, $N_R$ designates a noise power spectrum density of the at least one relay, $N_D$ designates a noise power spectrum density of the receiving antenna, h designates a vector with respect to channel information between an M number of relays and the source, $\overline{H}_i$ designates a diagonal matrix with respect to channel information between an $i^{th}$ receiving antenna and the at least one relay, N designates a number of receiving antennas, + designates a Hermitian matrix, t designates a transpose matrix, I designates an identity matrix, d designates a power control signal matrix of the eigenvector corresponding to the maximum generalized eigenvalue with respect to each of the at least one relay, and λ designates a predetermined power distribution value between the source and the at least one relay.

3. The apparatus of claim 1, further comprising:
a receive mode determination unit which determines a receive mode based on the channel information and the power control signal with respect to the at least one relay.

4. The apparatus of claim 3, wherein the receive mode determination unit determines, as the receive mode, at least one of a receive mode of directly receiving only signals which are transmitted from the source via the plurality of receiving antennas, a receive mode of receiving signals which are transmitted from the source and the at least one relay via the plurality of receiving antennas, and a plurality of receive modes of receiving signals which are transmitted from the source and the at least one relay via only a single antenna among the plurality of receiving antennas, and corresponding to the plurality of receiving antennas respectively.

5. The apparatus of claim 4, wherein the receive mode determination unit calculates an SNR with respect to each of the plurality of receive modes, and determines, as the receive mode, a receive mode corresponding to the largest calculated SNR.

6. The apparatus of claim 4, wherein the receive mode determination unit determines the receive mode using the following equation:

$$\frac{E_S}{N_D}(1+\lambda)|h_0|^2,$$

$$\max \frac{E_S}{N_D} \frac{r^+\left(\lambda HDhh^+ D^+ H^+ + |h_0|^2\left(\frac{HDD^+ H^+}{\beta}+I_N\right)\right)r}{r^+\left(\frac{HDD^+ H^+}{\beta}+I_N\right)r},$$

$$\max \frac{E_S}{N_D} \frac{d_j^+\left(\lambda \overline{H}_j hh^+ \overline{H}_j^+ + |h_0|^2\left(\frac{\overline{H}_j \overline{H}_j^+}{\beta}+I_M\right)\right)d_j}{d_j^+\left(\frac{\overline{H}_j \overline{H}_j^+}{\beta}+I_M\right)d_j},$$

$$|d_j|=1, \; j=1,2,\ldots,N$$

where $E_s$ designates a signal energy transmitted from the source, β designates $N_D/N_R$, $N_R$ designates a noise power spectrum density of the at least one relay, $N_D$ designates a noise power spectrum density of one of the receiving antennas, h designates a vector with respect to channel information between an M number of relays and the source, $h_0$ designates channel information between the source and the plurality of receiving antennas, $\overline{H}_j$ designates a diagonal matrix with respect to channel information between a $j^{th}$ receiving antenna and the at least one relay, H designates a channel information matrix between an N number of receiving antennas and the M number of relays, N designates a number of receiving antennas, + designates a Hermitian matrix, r designates a combine vector of a signal which is received at the N number of receiving antennas, I designates an identity matrix, d designates a power control signal matrix of the eigenvector corresponding to the maximum generalized eigenvalue with respect to each of the at least one relay, and λ designates a power distribution value between the source and the at least one relay.

7. A method of controlling a power of a controlled relay, the method comprising:
receiving signals which are transmitted to a plurality of receiving antennas directly from a source or via at least one relay;
acquiring channel information between the source and the at least one relay, and between the at least one relay and the plurality of receiving antennas;
generating a power control signal, based on the acquired channel information and an SNR of at least one of the signals received; and
transmitting the generated power control signal to the controlled relay to control a transmit signal power with respect to the controlled relay,
wherein the SNR corresponds to a maximum SNR of the signals received which is calculated before the signals received are combined, and
wherein the generating generates a power control signal based on an eigenvector corresponding to a maximum generalized eigenvalue with respect to each of the at least one relay, based on the acquired channel information and the maximum SNR.

8. The method of claim 7, wherein the generating generates the power control signal of the eigenvector corresponding to the maximum generalized eigenvalue with respect to each of the at least one relay based on the following equation $$SNR = \frac{E_S}{N_R} \frac{d^+\left(\sum_{i=1}^{N} \overline{H}_i hh^+ \overline{H}_i^+\right)d}{d^+\left(\sum_{i=1}^{N} \overline{H}_i \overline{H}_i^+ + \beta I_N\right)d}, \; \beta = \frac{N_D}{N_R}$$

$$h = [h_1 \; h_2 \; \cdots \; h_M]^t,$$
$$\overline{H}_i = diag[h_{i,1} \; h_{i,2} \; \cdots \; h_{i,M}], \; |d| = \lambda E_S$$

where $E_s$ designates a signal energy transmitted from the source, $N_R$ designates a noise power spectrum density of the at least one relay, $N_D$ designates a noise power spectrum density of the receiving antenna, h designates a vector with respect to channel information between an M number of relays and the source, $\overline{H}_i$ designates a diagonal matrix with respect to channel information between an $i^{th}$ receiving antenna and the at least one relay, N designates a number of receiving antennas, + designates a Hermitian matrix, t designates a transpose matrix, I designates an identity matrix, d designates a power control signal matrix of the eigenvector corresponding to the maximum generalized eigenvalue with respect to each of the at least one relay, and λ designates a predetermined power distribution value between the source and the at least one relay.

9. The method of claim 7, further comprising:
determining a receive mode based on the channel information and the power control signal with respect to the at least one relay.

10. The method of claim 9, wherein the determining determines, as the receive mode, at least one of a receive mode of directly receiving only signals which are transmitted from the source via the plurality of receiving antennas, a receive mode of receiving signals which are transmitted from the source and the at least one relay, via the plurality of receiving antennas, and a plurality of receive modes of receiving signals which are transmitted from the source and the at least one relay, via only a single antenna among the plurality of receiving antennas, and corresponding to the plurality of receiving antennas respectively.

11. The method of claim 10, wherein the determining further calculates an SNR with respect to each of the plurality of receive modes, and determines as the receive mode a receive mode corresponding to the largest calculated SNR.

12. The method of claim 10, wherein the determining determines, the receive mode using the following equation:

$$\frac{E_S}{N_D}(1+\lambda)|h_0|^2,$$

$$\max \frac{E_S}{N_D} \frac{r^+\left(\lambda HDhh^+D^+H^+ + |h_0|^2\left(\frac{HDD^+H^+}{\beta}+I_N\right)\right)r}{r^+\left(\frac{HDD^+H^+}{\beta}+I_N\right)r},$$

$$\max \frac{E_S}{N_D} \frac{d_j^+\left(\lambda \overline{H}_j hh^+ \overline{H}_j^+ + |h_0|^2\left(\frac{\overline{H}_j\overline{H}_j^+}{\beta}+I_M\right)\right)d_j}{d_j^+\left(\frac{\overline{H}_j\overline{H}_j^+}{\beta}+I_M\right)d_j},$$

$$|d_j|=1,\ j=1,2,\ldots,N$$

where $E_s$ designates a signal energy transmitted from the source, $\beta$ designates $N_D/N_R$, $N_R$ designates a noise power spectrum density of the at least one relay, $N_D$ designates a noise power spectrum density of one of the receiving antenna, h designates a vector with respect to channel information between an M number of relays and the source, $h_0$ designates channel information between the source and the plurality of receiving antennas, $\overline{H}_j$ designates a diagonal matrix with respect to channel information between a $j^{th}$ receiving antenna and the at least one relay, H designates a channel information matrix between an N number of receiving antennas and the M number of relays, N designates a number of receiving antennas, + designates a Hermitian matrix, r designates a combine vector of a signal which is received at the N number of receiving antennas, I designates an identity matrix, d designates a power control signal matrix of the eigenvector corresponding to the maximum generalized eigenvalue with respect to each of the at least one relay, and $\lambda$ designates a power distribution value between the source and the at least one relay.

13. A non-transitory computer-readable medium storing a program for implementing a method of controlling a power of a relay, the method comprising:

receiving signals which are transmitted to a plurality of receiving antennas directly from a source or via at least one relay;

acquiring channel information between the source and the at least one relay, and acquiring channel information between the at least one relay and the plurality of receiving antennas;

generating a power control signal, based on the acquired channel information and a signal-to-noise ratio (SNR) of at least one of the signals received; and transmitting the generated power control signal to the relay and thereby controlling a transmit signal power with respect to the at least one relay, wherein the SNR corresponds to a maximum SNR of the signals received which is calculated before the signals received are combined, and wherein the generating generates a power control signal based on an eigenvector corresponding to a maximum generalized eigenvalue with respect to each of the at least one relay, based on the acquired channel information and the maximum SNR.

* * * * *